US006338588B1

(12) United States Patent
Yang

(10) Patent No.: US 6,338,588 B1
(45) Date of Patent: Jan. 15, 2002

(54) STABILIZATION COUPLING ADAPTED TO BOTH SIDES OF A ROTATABLE CLAMP BLOCK

(76) Inventor: Tai-Her Yang, No. 59, Chung Hsiang 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/520,138

(22) Filed: Mar. 7, 2000

(51) Int. Cl.[7] .......................... F16C 11/00; F16D 1/12; F16D 3/00

(52) U.S. Cl. ........................ 403/113; 403/116; 403/161

(58) Field of Search ................................ 403/113, 112, 403/116, 117, 161–163

(56) References Cited

U.S. PATENT DOCUMENTS

| | | | | | |
|---|---|---|---|---|---|
| 4,000,557 | A | * | 1/1977 | Bawden et al. | 29/525 |
| 4,068,961 | A | * | 1/1978 | Ebner et al. | 403/55 |
| 4,344,716 | A | * | 8/1982 | Sigal | 403/13 |
| 4,899,963 | A | * | 2/1990 | Murphy | 248/65 |
| 5,398,366 | A | * | 3/1995 | Bradley | 15/167.1 |
| 5,408,774 | A | * | 4/1995 | Grewe et al. | 40/606 |
| 5,794,897 | A | * | 8/1998 | Jobin et al. | 248/74.4 |
| 6,019,357 | A | * | 2/2000 | Bartsch et al. | 269/43 |
| 6,135,670 | A | * | 10/2000 | Bahnman et al. | 403/373 |

* cited by examiner

*Primary Examiner*—Lynne H Browne
*Assistant Examiner*—John B. Walsh
(74) *Attorney, Agent, or Firm*—Bacon & Thomas

(57) ABSTRACT

A rotatable clamp block mechanism includes a chassis having a first curved surface, and a rotatable clamp block having a second curved surface that slidably engages the first curved surface to permit the rotatable clamp block to rotate around an axis relative to the chassis. The second curved surface extends between flanges at axial ends of said second curved surface. The rotatable clamp block is coupled to the chassis by respective curved slots at axial ends of the first curved surface, and by screws or pins extending from each of the flanges into the curved slots to rotatably couple the rotatable clamp block to the chassis.

9 Claims, 5 Drawing Sheets

STABILIZATION COUPLING ADAPTED TO BOTH SIDES OF A ROTATABLE CLAMP BLOCK

SUMMARY OF THE INVENTION

A stabilization coupling for both sides of a rotatable clamp block features the tensile strength to withstand forces resulting from the arched coupling interfacing between the rotatable block and the corresponding chassis, as does a traditional rotatable clamp coupling mechanism, but is further reinforced with a stabilization structure on either side thereof to substantially enhance axial traction occasioned by the irregularity of an object being clamped. The enhanced axial traction provides an advantage over the coupling structure of any similarly configured conventional mechanism. Other advantages include compactness, convenience and ease of processing, assembly, and servicing. The device finds extensive application in benchtop vices, mechanical vices of a hardware mechanic's trade or of a carpenter's trade, carpenter's consoles, clamping structures in various hand clamps, wrench tools, robot arms, as well as measuring tools or clamping implements which must be held in place while being rotated.

DETAILED DESCRIPTION OF THE PREFERRED EMBODIMENTS

Figure 1:
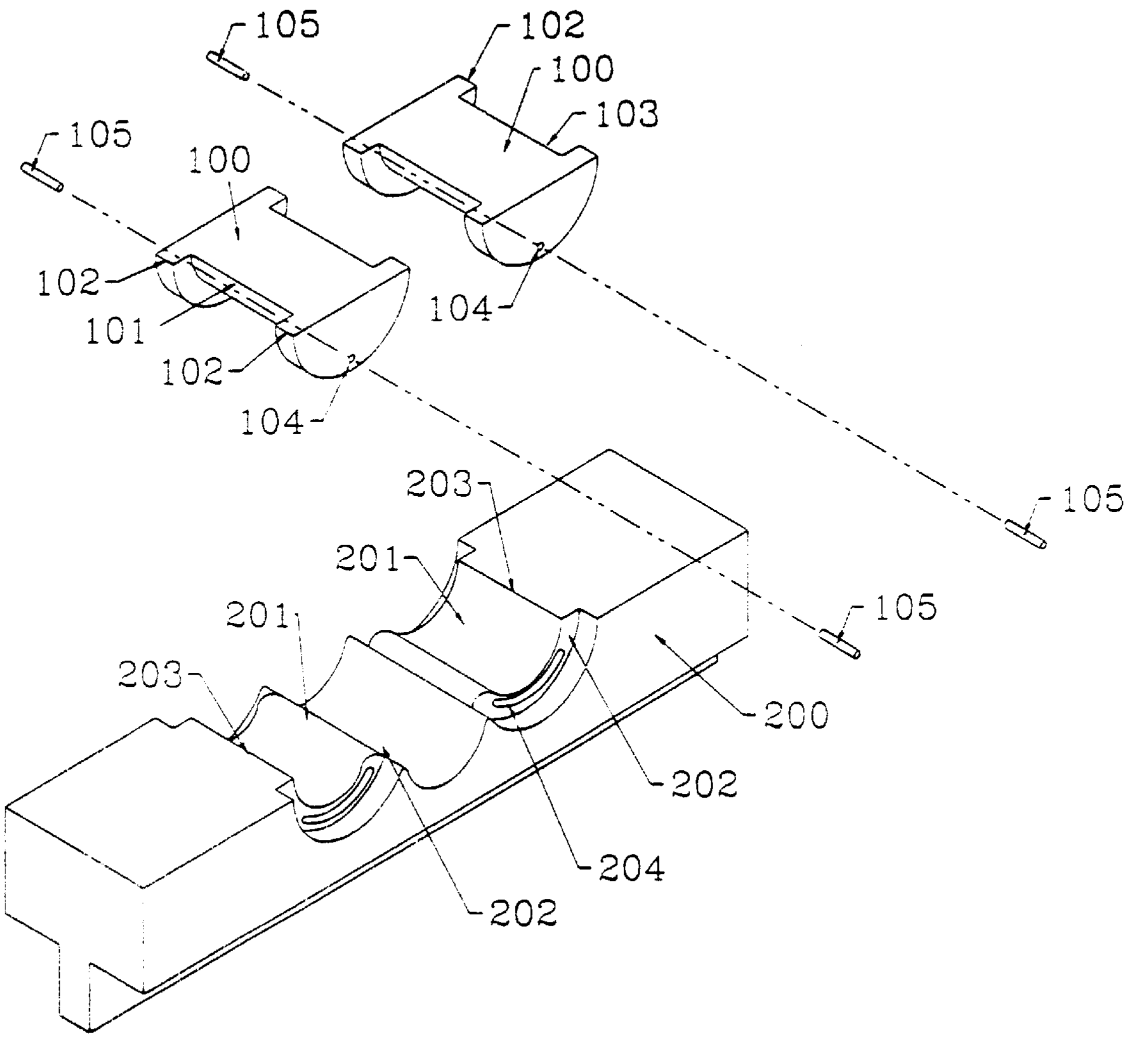
FIG. 1 is a three-dimensional exploded perspective view of a preferred embodiment of the invention.
Figure 2:
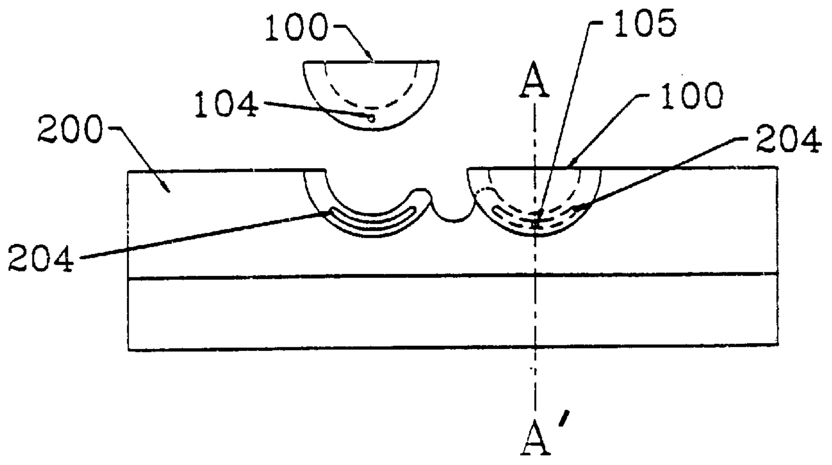
FIG. 2 is a frontal view of the assembly of FIG. 1.
Figure 3:
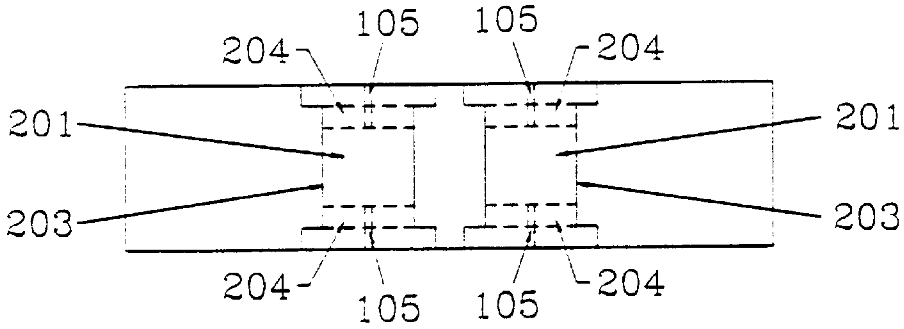
FIG. 3 is a top view of the assembly of FIG. 1.
Figure 4:
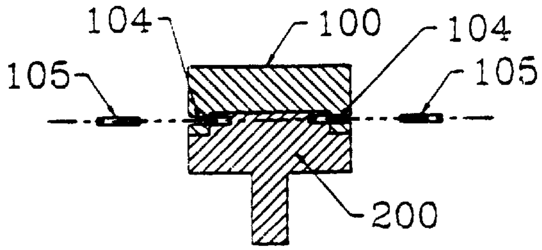
FIG. 4 is a cross-section taken along segment A–A' of FIG. 1.
Figure 5:
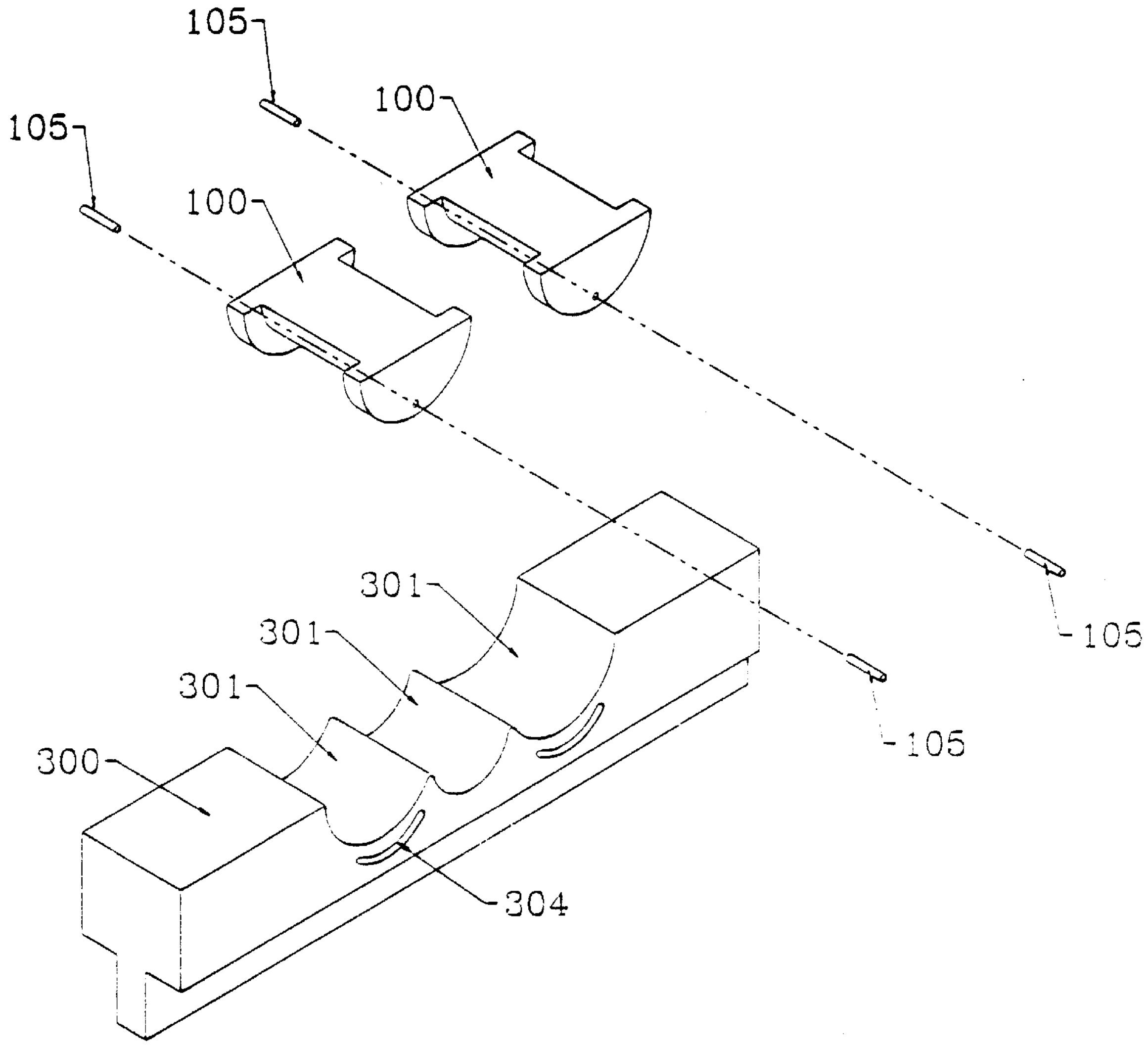
FIG. 5 is a three-dimensional perspective view of a preferred embodiment of the invention in which the chassis consists of three coupling interfaces.
Figure 6:
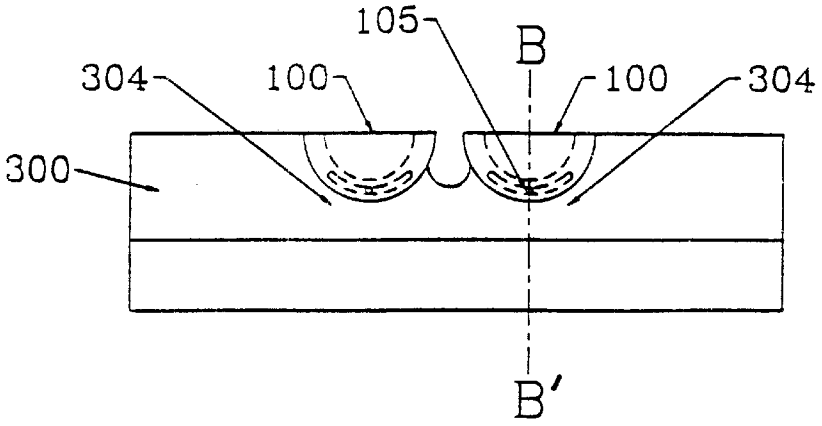
FIG. 6 is an elevation view of the assembly of FIG. 5.
Figure 7:
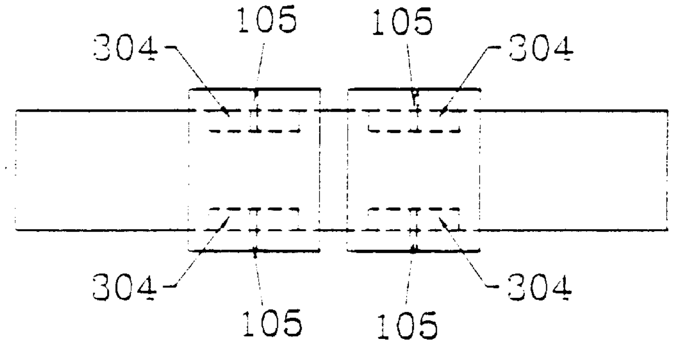
FIG. 7 is a top view of the assembly shown in FIG. 5.
Figure 8:
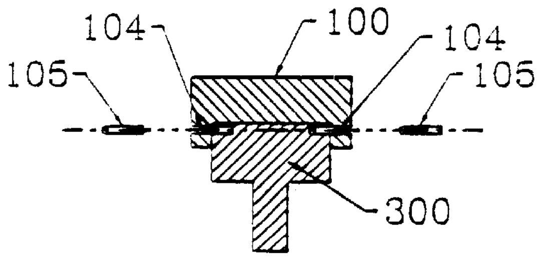
FIG. 8 is a cross-section taken along segment B–B' of FIG. 5.

This invention relates to the structure of a stabilization coupling for both sides of a rotatable clamp block. The rotatable clamp block is capable of autonomous adjustment of clamping angles to suite the contour of the object being clamped, as is summarily illustrated in FIGS. 1–4. The invention includes a rotatable clamp block 100 having an arched coupling interface 101 coupled to the chassis 200 via one or more arched notches 201, and that is characterized in that the cross-section of the arched coupling interface 101 on the rotatable clamp block 100 is flanked on either side with a pair of flanges 102 which form a notched section with a retracted groove 103 in the center. The flanges 102, duly arched, are each drilled with a pinhole or screwhole 104 to accommodate a set pin or screw 105. Opposite ends of each of the arched notches 201 are cut to form retracted steps 202 that define therebetween a central flange 203. The retracted steps 202 include a semi-circular or crescent-shaped coulisse or slot 204 coaxial with the center of rotation of rotative clamp block 100, both ends of each coulisse being closed for engagement with the set pin or screw 104 associated with the rotatable clamp block 100, in order for the rotatable clamp block 100 to enjoy unrestrained rotation within a set angle, namely, a predetermined angular displacement limited by both closed ends of the crescent coulisse 204.

In a specific variation of the embodiment per FIG. 1, the structure of the chassis may be one embodying a triplicate coupling interface in respect to which a three-dimensional perspective is given in FIGS. 5–8. Instead of retracted steps on both sides of the arched notches, in view of cost economy, each end of the arched notch 301 formed by sides of the chassis 300 may directly include a crescent coulisse 304 coaxial with the center of rotation of the rotative clamp block 100 on a side extended at a specific angle rearwards of the arched notch 301, both ends of the crescent slot or coulisse 304 being closed to facilitate coupling with the set pin or screw 104 associated with the rotative clamp block 100 and free rotation by the rotative clamp block 100 within a set angle which is to be determined by both closed ends of the crescent coulisse 304 acting altogether.

Figure 9:
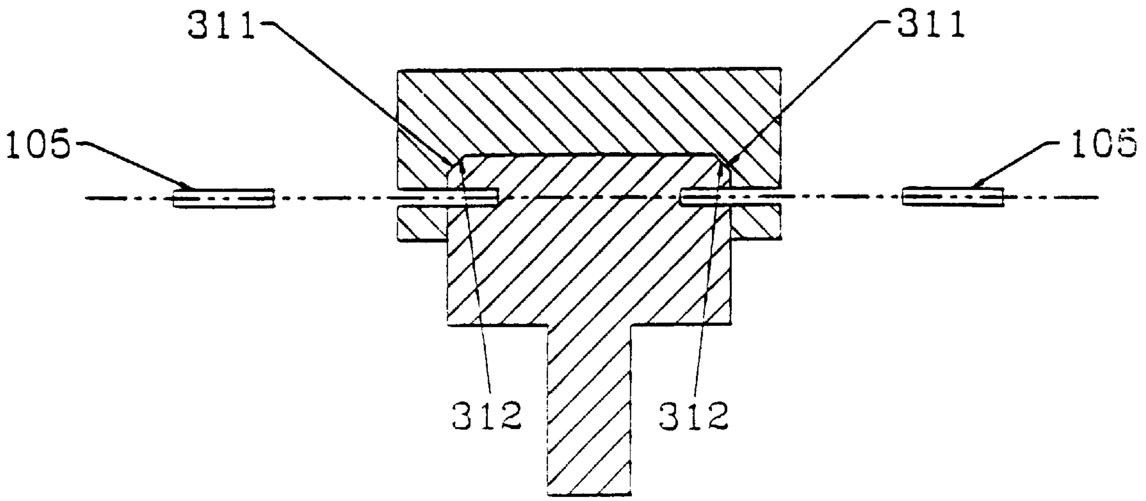
FIG. 9 is a cross-sectional view of a preferred embodiment of the invention having a trapezoidal slope complete with multiple faceted coupling interfaces; and, FIG. 10 is a cross-section of a preferred embodiment of the invention having arched multiple-faceted coupling interfaces.

In a variation of the embodiments illustrated in FIGS. 1–8, a trapezoidal multiple faceted coupling interface may be provided to further enhance the strength of the rotatable clamp block, such as is illustrated in FIG. 9. The trapezoidal multifaceted coupling features a rotatable clamp block trapezoidal structure 311 complemented with a correspondingly shaped structure 312 for ready coupling engagement on the chassis.

Figure 10:
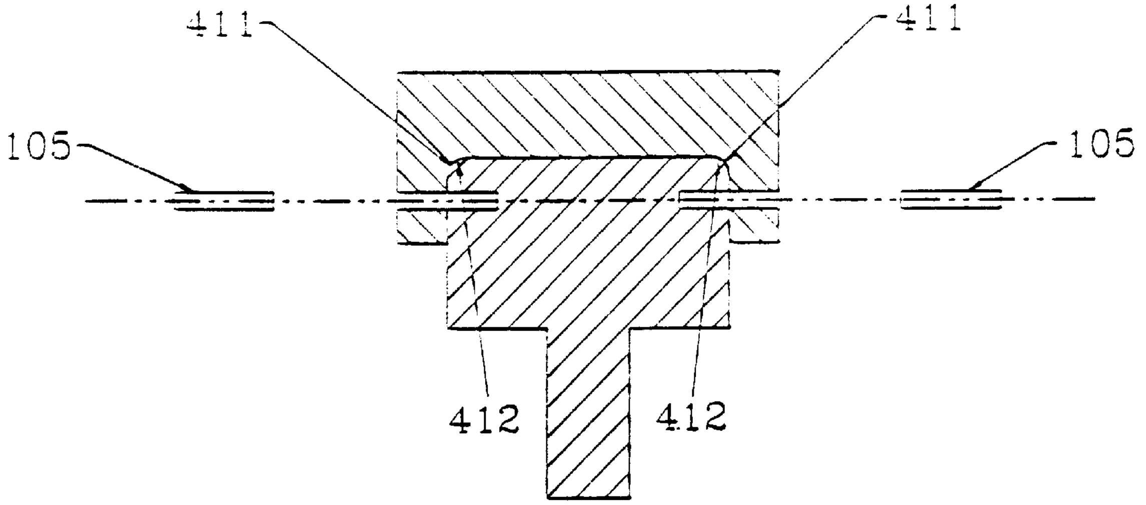

The rotatable clamp block and chassis of FIGS. 1–8 may further incorporate an alternative arched multiple faceted coupling means to enhance the strength of the rotatable clamp block as illustrated in the cross-sectional view of FIG. 10. The multiple faceted coupling means of FIG. 10 features an arched surface 411 on the coupling block and a correspondingly shaped arched surface 412 on the chassis for mutual coupling purposes.

The invention exemplified by the embodiments of FIGS. 1–10 adapted to couple both sides of a rotatable clamp block provides the tensile strength to withstand arched coupling interfacing on the part of mobile block and chassis, as does a traditional rotatable clamp coupling mechanism, but is further reinforced with a stabilization structure on either side thereof to enhance axial traction occasioned by the irregularity of the object being clamped, in contrast to such a feature the coupling structure of any otherwise configured conventional mechanism, and further provides advantages of compact size, and convenience and ease of processing, assembly, and servicing.

In practice, the stabilization coupling of the preferred embodiments, may be embodied either by having one rotatable clamp block complete with a stabilizer means on either side thereof coupled to a single clamp assembly chassis, or alternatively to clamp assemblies which consist of one or more sets of bilateral stabilization coupling chassis structures each furnished with a rotatable clamp block; or still further by the combination of one or more sets of bilateral stabilization coupling structures furnished with rotatable clamp blocks having one or more sets of clamp assemblies each equipped with a level clamp front or with a clamp assembly of otherwise fixed geometric configuration.

The invention finds extensive applications in benchtop vices, mechanical vices of hardware mechanic's trade or of a carpenter's trade, carpenter's consoles, clamping structure in various hand clamps, wrench tools, robot arms, as well as in measuring tools or clamping implements which must be held in place while rotating.

What is claimed is:

1. A rotatable clamp block mechanism, comprising:

a chassis having a first curved surface;

a rotatable clamp block having a second curved surface that slidably engages the first curved surface to permit the rotatable clamp block to rotate around an axis relative to the chassis, said second curved surface extending between flanges at axial ends of said second curved surface;

respective curved slots at axial ends of the first curved surface, said curved slots being situated in respective walls of said chassis that extend transversely to the first curved surface;

a coupling member extending from each of said flanges into said curved slots to rotatably couple said rotatable clamp block to said chassis.

2. A rotatable clamp block mechanism as claimed in claim 1, wherein said coupling members are pins fitted into and extending inwardly from holes in said flanges.

3. A rotatable clamp block mechanism as claimed in claim 1, wherein said coupling members are screws.

4. A rotatable clamp block mechanism as claimed in claim 1, wherein said ends of said first curved surface include stepped portions, said curved slots being situated in respective walls formed by said stepped portions.

5. A rotatable clamp block mechanism as claimed in claim 1, wherein said chassis includes at least two said first curved surfaces.

6. A rotatable clamp block mechanism as claimed in claim 5, further comprising a third curved surface situated between said two first curved surfaces.

7. A rotatable clamp block mechanism as claimed in claim 1, further comprising complementary facets in said chassis and clamp block that extend along arcs at ends of said first and second curved surfaces.

8. A rotatable clamp block mechanism as claimed in claim 1, wherein edges at ends of said first and second curved surfaces are rounded.

9. A rotatable clamp block mechanism as claimed in claim 1, wherein said clamp block mechanism fits within a tool selected from the group consisting of benchtop vices, carpenter's vices, mechanic's vices, hand clamps, wrench tools, robot arms, and measuring tools.

* * * * *